Nov. 16, 1948.                    C. GAINES                    2,453,899
                SWIVELING RECIPROCATING-SAW SAWING MACHINE
Filed Aug. 16, 1946                                    3 Sheets-Sheet 1
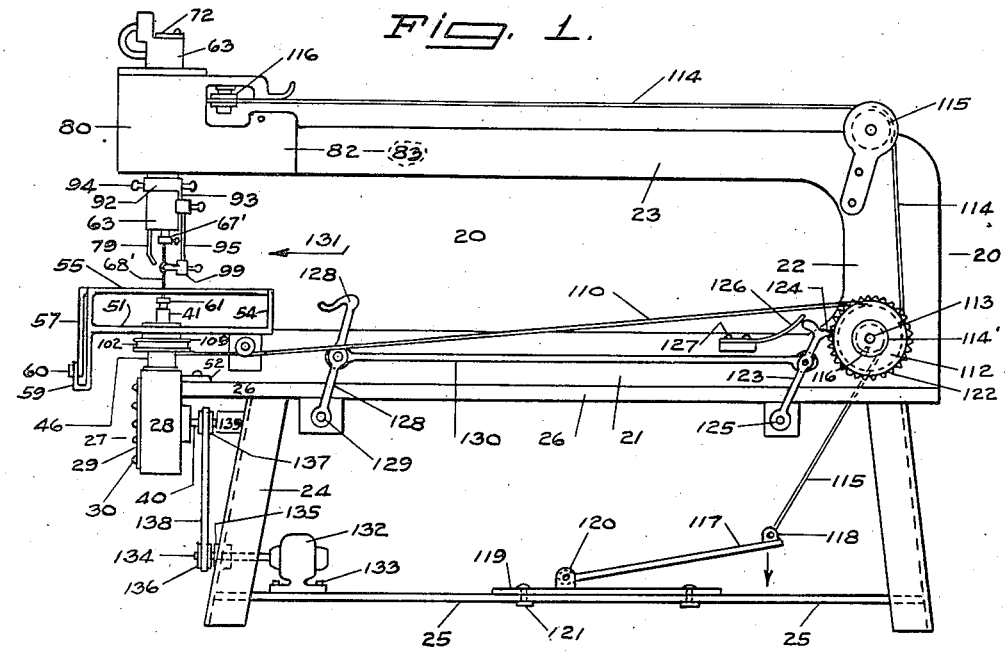
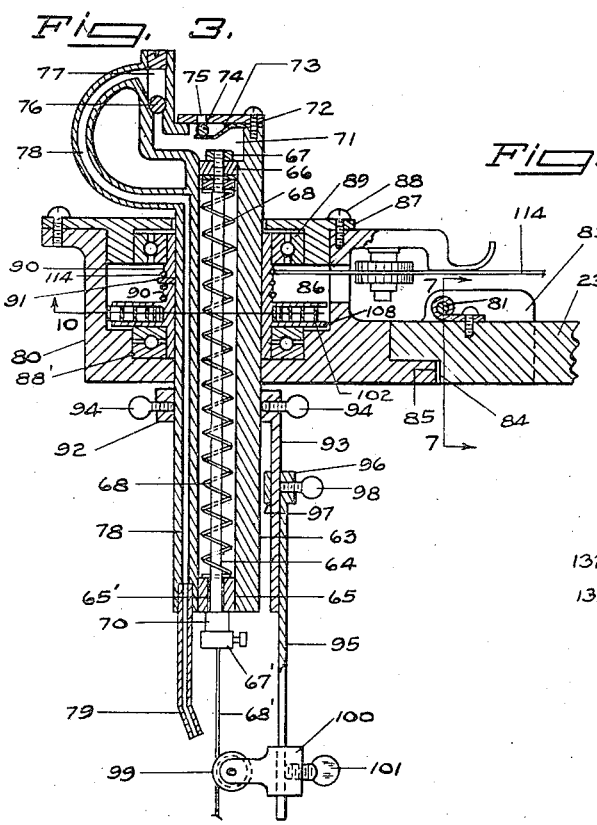
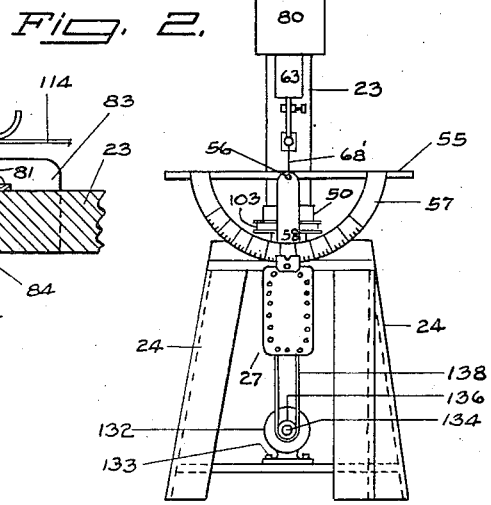
INVENTOR.
CHARLES GAINES
BY Edward C. Healy
ATTORNEY Nov. 16, 1948.  C. GAINES  2,453,899
SWIVELING RECIPROCATING-SAW SAWING MACHINE
Filed Aug. 16, 1946  3 Sheets-Sheet 2

INVENTOR.
CHARLES GAINES
BY Edward C. Healy
ATTORNEY

Nov. 16, 1948.     C. GAINES     2,453,899
SWIVELING RECIPROCATING-SAW SAWING MACHINE
Filed Aug. 16, 1946     3 Sheets-Sheet 3
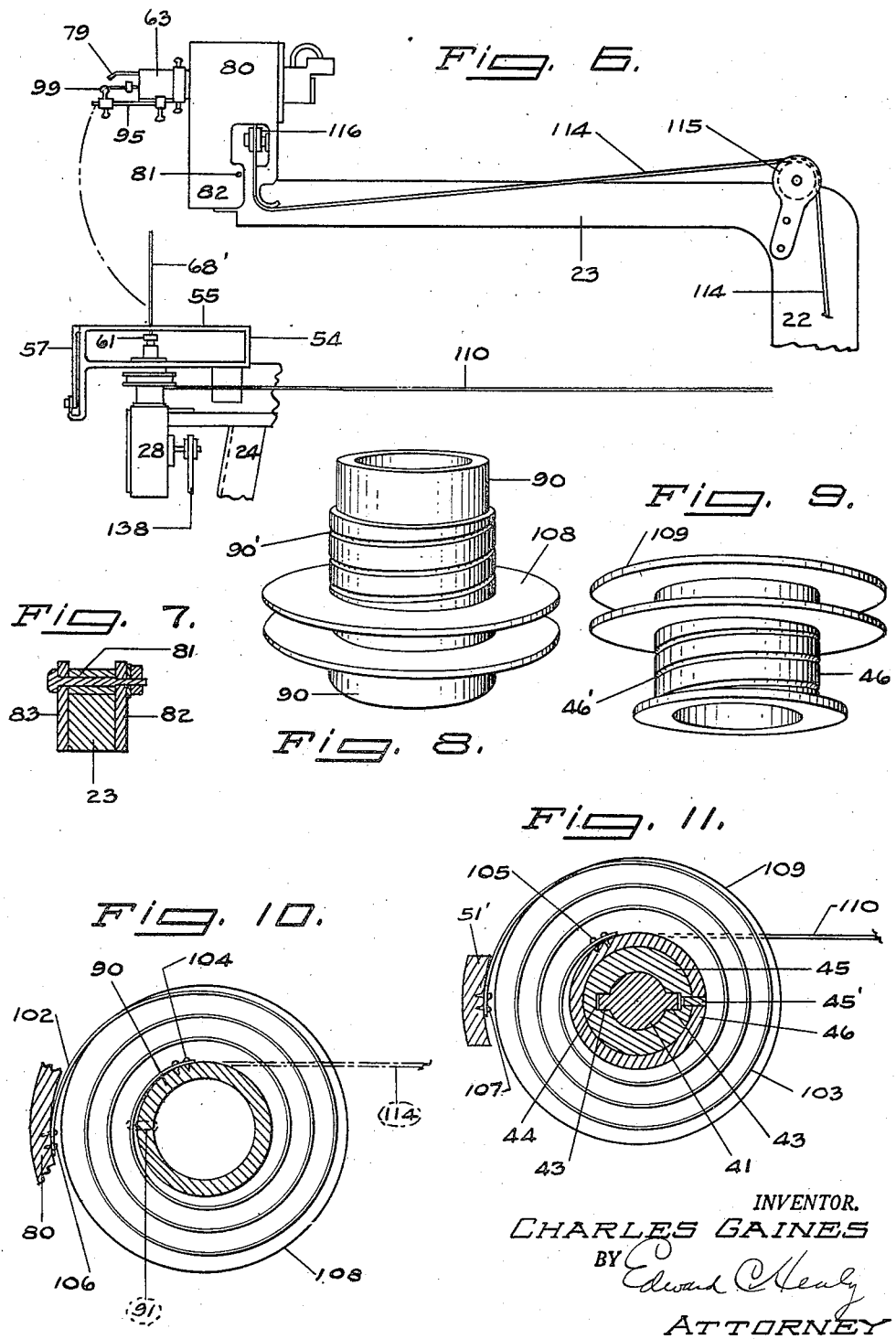
INVENTOR.
CHARLES GAINES
BY Edward C Healy
ATTORNEY Patented Nov. 16, 1948

2,453,899

UNITED STATES PATENT OFFICE 2,453,899

SWIVELING RECIPROCATING-SAW SAWING MACHINE

Charles Gaines, Vallejo, Calif.

Application August 16, 1946, Serial No. 691,136

1 Claim. (Cl. 143—73)

This invention relates to an improved jig saw in which the saw blade of the saw is secured to two oppositely opposed vertically reciproactive members, which members are slidably positioned in oppositely opposed heads.

One of the objects of the present invention is to provide a jig saw machine with an improved mechanism for adjusting the angle of the saw blade in its sawing position while the machine is in operation, whereby the blade will follow the design lines to be cut instead of having to feed the work against a blade that is held in one position.

Another object of the present invention is to control the blade adjusting mechanism by means of a foot pedal that is positioned to be manipulated by the operator while the machine is in operation.

A further object of the present invention is the provision in the blade adjusting mechanism of a pair of spirally grooved drum wheels, one of which is secured to the upper blade holding member of the machine and the other to the lower blade holding member thereof, both of the said spirally grooved drum wheels being connected to the foot pedal of the machine through the medium of a suitable card, whereby the said blade holding members are circumferentially adjusted and controlled by manipulating the foot pedal while the machine is in operation.

A still further object of the present invention is to provide a pair of clock springs for producing a circumferential tension on the said blade holding members in a certain direction and to provide adjustable means for locking said blade holding members against said tension.

A still further object of the present invention is to provide means for longitudinally adjusting the upper head of the machine with respect to the working table to compensate for different widths of work to be sawed and to also provide means for vertically swinging the said upper head away from the said table to facilitate the placing of the work onto the table.

A still further object of the present invention is to adjustably support the working table, directly at the center thereof, to the lower head of the machine whereby the table can be tilted at different angles without interfering with the saw blade.

An additional object of the present invention is to provide a jig saw machine of the character described that is durable, adjustable, simple in construction, economical to manufacture, positive in operation, and highly efficient and serviceable in use.

In the accompanying drawing forming a part of the specification and wherein for the purpose of illustration like numerals designate like parts throughout the same, Fig. 1 is a side elevational view of the machine, Fig. 2 is a front elevational view of the same, Fig. 3 is an enlarged vertical longitudinal sectional view of the upper head.

Fig. 6 is a side elevational fragmentary view of the upper part of the machine showing the upper head in its open position.

Fig. 7 is vertical sectional view taken through line 7–7 of Fig. 3 looking in direction of the arrows, Fig. 8 is an enlarged perspective view of the upper spirally grooved drum wheel employed in the invention, Fig. 9 is an enlarged perspective view of the lower spirally grooved drum wheel, Fig. 10 is an enlarged sectional view taken through line 10 of Fig. 3 showing a clock spring in elevation connected to the upper drum wheel.

Figure 4:
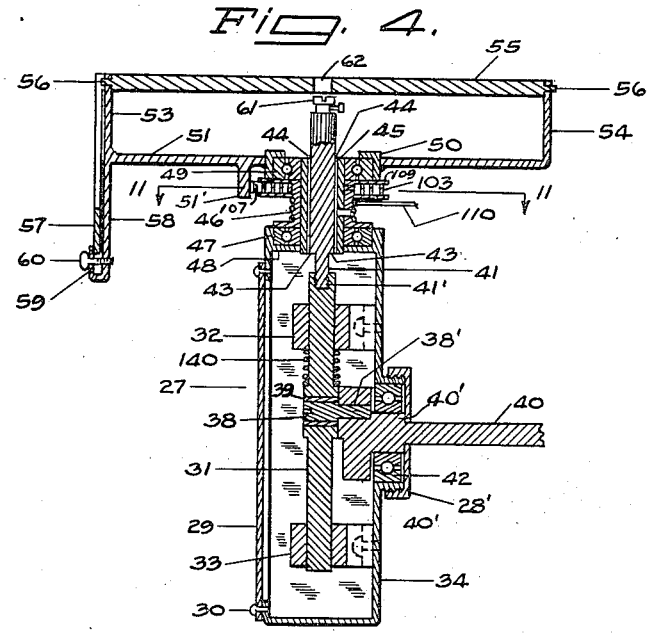
Fig. 4 is an enlarged vertical longitudinal sectional view of the lower head.

Fig. 11 is an enlarged sectional view taken through line 11–11 of Fig. 4 showing a clock spring in elevation connected to the lower drum wheel and also illustrating how the lower saw holding member is vertically slidable in its respective drum wheel and circumferentially keyed thereto.

Referring in detail to the drawings and to the different parts thereof, the numeral 20 designates, as a whole, the main frame of the machine, comprising an elongated horizontal base portion 21, an upwardly extending back portion 22, and overhanging horizontal top portion 23, which frame is substantially supported on a plurality of suitable legs 24. The said legs are preferably of angular configuration and are fixed together at their lower portions thereof by a longitudinally extending plate 25 and at their upper ends by a longitudinal upper plate 26 and upon which the main frame 20 is rigidly secured in any suitable manner.

The lower head of the machine designated as a whole by the numeral 27, includes a suitable vertical housing 28 having a cover 29 removably secured thereto by a plurality of screws 30 whereby the saw reciprocating mechanism is completely enclosed and sealed and capable of being properly lubricated. The saw reciprocating mechanism comprises a vertical shaft 31 slidably supported in a pair of spaced bearings 32 and 33, Figs. 4 and 5, which bearings are secured to the back 34 of the housing 28 by a plurality of screws 35. The said vertical shaft 31 embodies in its construction a horizontal cross member 36, which cross member is horizontally slotted as at 37 for receiving the driving pin 38 carrying a revolvable bushing 39. A horizontal shaft 40, having an enlarged circular end portion 40', is fixed into a ball bearing 42 that is supported in the housing 28, as at 28', and the said driving pin 38 is eccentrically fixed into the said enlarged shaft portion 40', as at 38', whereby reciprocatory movement is imparted to the vertical shaft 31 when revolvable movement is imparted to the horizontal shaft 40.

A secondary vertical shaft 41 is provided and is threadedly or otherwise suitably secured to the upper extremity of the said first mentioned shaft 31, as at 41' in Fig. 4, and the said secondary shaft is formed with oppositely opposed key portions 43, which key portions 43, are slidably mounted into slotted keyways 44 provided in a bushing 45 that is fixed into the drum wheel 46, see Fig. 11. The lower end portion of the said bushing 45 is fixed into a ball bearing 47, which ball bearing 47 is supported in the top part of the vertical housing 28, as at 48. The upper portion of the said bushing 45 is fixed into a ball bearing 49 that is supported to a shouldered bushing 50, which bushing is fixed into the working table frame 51. The said vertical housing 28 is secured to the plate 26, as at 52, Fig. 1, that is fixed to the legs 24 and upon which the main frame 20 is supported.

Figure 5:
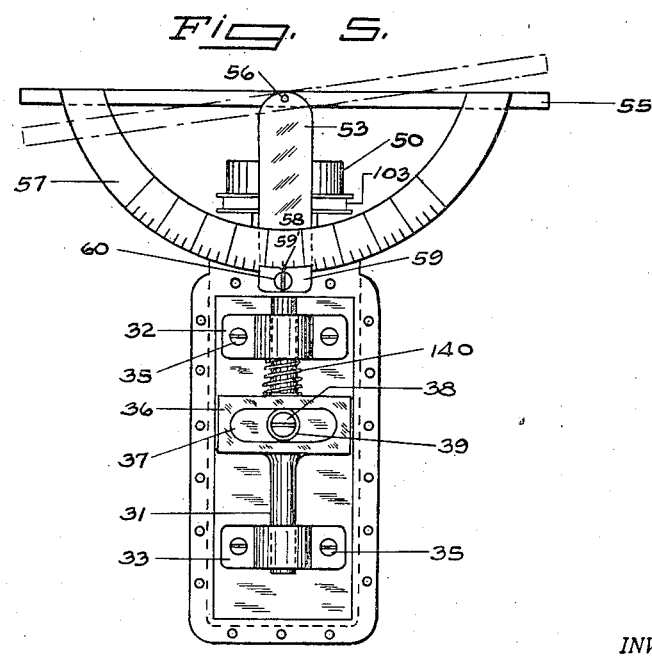
Fig. 5 is an enlarged front elevational view of the lower head with the cover removed.

The said frame 51 is formed with upwardly extending oppositely opposed end members 53 and 54 and the working table 55 is pivotally secured thereto as shown at 56 in Figs. 4 and 5. A suitable protractor 57 is fixed to the front extremity of the working table 51 and the end portion 58 of the said working table extends downwardly and overlaps the protractor as at 59, whereby the said protractor 57 and working table 55 are locked by a suitable thumb screw 60, there being sufficient resiliency in the overlapping portion 59 for enabling the said thumb screw to rigidly hold the parts together. The notch 59' indicates the angle of the working table. The numeral 61 designates a conventional jig saw blade holder fixed to the upper extremity of the secondary shaft 41 and the numeral 62 designates an aperture in the center of the working table and which is in vertical alignment with the said blade holder for accommodating the blade.

The numeral 63 designates the top head illustrated to advantage in Fig. 3 and which is preferably an elongated vertical cylindrical member into which there is mounted a suitable square piston rod 64 that is slidably supported into an end plug 65, which end plug has a square opening 65' for guiding the piston rod and is threadedly secured or otherwise suitably fixed into the lower portion of said head 63. A suitable plunger 66 is secured to the upper end of the piston rod as at 67 and has a close sliding fit within the head and a coil spring 68 is interposed between the said fixed plug 65 and the slidable plunger 66. A conventional saw blade holder 67' is secured to the lower extremity of the piston rod 64 for retaining a suitable jig saw blade 68' at the upper portion thereof, the lower portion of the said blade being secured to the blade holder 61 provided in the lower head as illustrated to advantage in Fig. 1. The lower extremity of the said piston rod 64 is enlarged as at 70 and provides a stop for limiting the uppermost position of the said rod.

An air receiving chamber 71 is formed in the upper extremity of the said head and a removable cover 72 closes the same. A suitable spring controlled check valve is provided and comprises a spring member 73, a ball 74 fixed thereto and an air inlet 75 in the said cover 72. A second ball check valve 76 controls the outlet 77 of the said chamber 71. An air discharge passageway 78 leads from the said outlet 77 to the bottom of the head and a tubular member 79 leads from the said passageway and toward the saw blade 68' as shown in Fig. 3. It will thus be obvious that when the machine is in operation and reciprocatory movement is imparted to the piston rod 64 and plunger thereon 66 air will be drawn into the chamber 71 and will be discharged through the passageway 68 and out of the tube 79 and onto the jig saw, whereby saw dust caused by cutting the wood will be blown away from the same.

The said upper head 63 is substantially supported in a suitable frame 80, which frame is hingedly secured to the overhanging horizontal arm 23, as at 81, whereby the said upper head is movable into an upper open position as shown to advantage in Fig. 6 to facilitate the placing of the material to be sawed onto the working table. The inner extremity of the said head frame supports the same onto the overhanging arm 23. The ends of the said head frame 80 and the arm 23 are notched as at 84 and 85 respectively and interlock with and abut against each other as shown in Fig. 3. The said head frame has an open portion 86 and a top plate 87 that preferably extends therein and is rigidly secured to the frame by suitable screws 88.

The preferred means provided for supporting the head 63 in the frame 80 consists in the provision of a thrust ball bearing 88' in the lower portion thereof and a radial ball bearing 89 in the upper portion and in the further provision of an especially constructed drum-wheel 90 that is mounted on the said head 63 and fixed into the said ball bearings as shown in Fig 3. The said drum-wheel 90 is preferably slidable on the said head and is adjustably secured thereto by a suitable set screw 91. It will be apparent that the head is vertically movable in the head frame and can be substantially held at different vertical heights by the set screw 91. A collar 92 having an integral downwardly extending arm 93 is slidably mounted on said head 63 and is adjustably secured thereto by the thumb screws 94. A secondary downwardly extending arm 95 is provided and formed with an enlarged upper portion 96, which portion is slotted as at 97, whereby the said secondary arm 95 is capable of being slidably mounted onto the said first mentioned arm 93 and fixed thereto by the thumb screw 98 as shown in Fig. 3. A conventional blade guide 99 is adjustably retained onto the said secondary arm 95 through the medium of a suitable holder 100, which holder is slidably secured to the said arm by the thumb screw 101.

From the foregoing description taken in conjunction with the accompanying drawings, it will be obvious that the head 63 is vertically slidable in the head frame 80, also that the arm 93 is vertically slidable to different heights onto the said head and also that the secondary arm 95, carrying the blade guide 99, is vertically adjustable to different heights providing the widest range of adjustment for handling various classes of work. The ordinary jig saw has approximately one and one-half inches stroke and the teeth of the saw soon become dull on that particular part. In the present machine the upper part of the saw blade can be lowered when the teeth become dull and unused sharp teeth employed. The hinged feature of the upper head eliminates the necessity of bending the blade when changing the work to cut apertures and thus prolongs the life of the blade. The swinging head is also a time saving feature.

As hereinbefore stated, the drum-wheel 90 is fixed to the upper head 63 by the set screw 91. The drum-wheel 46 is revolvably positioned onto the lower head 27 and is fixed to the bushing 45 and vertically keyed to the shaft 41 and is slidable thereon. The diameters of the said drum wheels 90 and 46 are identical. A spiral groove 46' (Fig. 9) is formed into and extends around the drum-wheel 46 and in a like manner a spiral groove 90' (Fig. 8) is formed into and extends around the drum-wheel 90. It will be noted that the jig saw blade is held in the upper extremity of the said shaft 41 in the said lower head 27 and also in the lower extremity of the said piston rod 64 in the said upper head 63. It will therefore be apparent that when the said shaft 41 and the said upper head 63 is circumferentially adjusted the cutting angle of the said jig saw blade will also be adjusted.

The preferred means for adjusting the said members, whereby the cutting angle of the blade will be adjusted while the machine is in operation, consists in providing a suitable clock spring 102 (Fig. 10) around the drum-wheel 90 in the upper head and a similar clock spring 103 (Fig. 11) around the drum-wheel 46 that is fixed to the bushing 45 in the lower head. The inner end portions of the said clock springs 102 and 103 are fixed to their respective drum-wheels 90 and 46 respectively as at 104 and 105 and the outer end portions of the said clock springs are fixed to the machine as at 106 and 107 respectively, whereby a spring tension in the same direction is applied to the said drum-wheels and the parts fixed thereto. Suitable flange portions 108 and 109 (Figs. 8 and 9) are formed on the said drum-wheels 90 and 46 respectively for properly guiding the said clock springs.

A flexible cord 110 is provided and the inner extremity thereof is fixed to the drum-wheel 46 and extends from the spiral groove therein to the outer periphery of a third drum-wheel 112, and is fixed thereto, which third drum-wheel is revolvably secured to the back portion 22 of the main frame 20 as at 113 shown to advantage in Fig. 1. A second flexible cord 114 is provided and an end portion thereof is also fixed to the outer periphery of the said third drum-wheel 112 and extends therefrom across two idler wheels 115 and 116 respectively and to the upper drum-wheel 90 that is secured to the upper head 63 as illustrated in Figs. 1 and 3. The outer periphery of the said third drum-wheel is also preferably spirally grooved to accommodate the proper guiding of the winding of the said cords thereon.

The said third drum-wheel functions as a control drum-wheel and 112 is formed with an outer circular extending portion 114' for accommodating a foot pedal cord 115 that is fixed to the outer periphery thereof as at 116 and is wound thereon and extends therefrom to the outer end of the foot pedal 117 and is pivoted thereto as at 118, which foot pedal is hinged to a base plate 119 as at 120, the said base plate being secured by suitable rivets or screws 121 to the lower plate 25 of the main frame of the machine as shown in Fig. 1.

The means provided for locking the drum-wheel 112 and the mechanism connected thereto consists in providing a plurality of gear teeth 122 around the periphery and at the outer lateral extremity thereof and in further providing a lever 123 having a tooth 124 capable of engaging with the teeth on the said drum-wheel and locking the same. The said lever 123 is pivoted to the main frame as at 125 and is resiliently held in locked position by a suitable curved spring 126 that is secured to the main frame as at 127. A second lever 128 is provided and pivoted to the main frame as at 129 and a suitable connecting rod 130 functions to connect the said levers 123 and 128 together. It will be apparent that when the lever 128 is moved in direction of the arrow 131 the lever 123 will be moved in its open position and in which position it will be unlocked from the control drum 112 and the said flexible cords 110 and 114 connected to the said control drum will be free to be controlled by the foot pedal 117. The clock springs 102 and 103 positioned on their respective drum-wheels 90 and 46 tend to pull the said cords 110 and 114 in a certain direction and pressing the said foot pedal 117 tends to pull the cords in the opposite direction, thus causing revolvable oscillative movement to be imparted to the said upper head 63 and the shaft 41 operable in the lower head, which oscillative movement adjusts the cutting angle of the saw blade 68 for enabling the said blade to follow the design lines to be cut instead of having to feed the work against a blade held in one position.

A suitable electric motor 132 is mounted on the frame plate 25 and is secured thereto by conventional bolts 133. The motor drive shaft 134 is revolvably supported in a suitable bearing 135 fixed onto the main frame and is provided with a suitable pulley 136 at the outer end portion thereof as shown in Fig. 1. The eccentric drive shaft 40 horizontally extending from the lower head of the machine is provided with a pulley 137 and a conventional belt 138 connects the motor shaft to the said drive shaft of the machine. Suitable bearing support is provided for the said drive shaft as at 139.

It will be seen to advantage in Fig. 4 that the said eccentric horizontal shaft 40 is eccentrically connected to the reciprocatory vertical shaft 31 and that a coil spring 140 is compressed against the horizontal cross member 36 on the said vertical shaft 31 when the saw blade is in its uppermost position and in which position the coil spring 68 in the head 63 is partially expanded. At this postion the eccentric starts to pull the saw blade downward and exerts a downward pulling tension on the same. When the said saw blade and the eccentric reach their lowermost positions the coil spring 68 in the upper head will have become compressed to its maximum and the said coil spring 140 in the lower head will have become expanded, thus enabling the coil spring 68 in the upper head 63 to exert an upward pulling tension on the saw blade for pulling the blade upward. It will be obvious that a pulling tension in both directions is continuously exerted on the saw blade and that the eccentric shaft 40 merely pulls the blade downward and the coil spring 68 in the upper housing pulls the blade upward.

Any conventional means can be employed for lubricating the various moving parts. Likewise, any suitable means can be employed for guiding the flexible cords and retaining the same in a taut condition. The spiral grooves in the drum-wheels 46 and 90 are identical to assure the proper adjusting of the saw blade and to prevent any possibility of twisting the blade while circumferentially adjusting the same.

The said spiral grooves are of sufficient depth capable of positively preventing the cords from slipping out of the same. A true circular groove can be provided in the drum-wheels if desired or the said grooves may be eliminated and the cords wind directly around the wheels. The said drum-wheels 46 and 90 are retained in their normal circumferential resilient positions by the respective clock springs that are secured thereto and to the main frame but it is to be understood that any suitable type of resilient means can be provided serving this purpose of the invention.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

A sawing machine of the character described comprising a main frame, an upper head member revolvably mounted thereon, a lower head member fixed to the frame and positioned beneath the said upper head member, a piston rod vertically positioned in the said upper head member, a jig saw blade holder secured to the lower extremity thereof, a shaft slidably mounted in the lower head member and positioned in vertical alignment with the said piston rod, a jig saw blade holder secured to the upper extremity of the said shaft, a jig saw blade secured to the said blade holders, a resilient means for retaining the said saw blade in a taut position, a drum-wheel fixed to the upper head member, a second drum-wheel fixed to the said shaft in the lower head member, a pair of clock springs, one of which is mounted on each of the said drum-wheels and adapted to exert a winding tension against the same, a third drum-wheel pivotally secured to the said main frame, a flexible cord wound on the first mentioned drum-wheel and connecting the same to the said third mentioned drum-wheel, a second flexible cord wound on the said second drum-wheel and connecting the same to the said third drum-wheel and a foot pedal and a cord connecting the same to the said third drum-wheel for enabling the said third drum-wheel to be manually operated for unwinding the said cords from the said first and second mentioned drum-wheels, whereby the jig saw blade is adjusted to vary the cutting angle thereof while the machine is in operation.

CHARLES GAINES.

REFERENCES CITED

The following references are of record in the file of this patent:

UNITED STATES PATENTS

| Number | Name | Date |
| --- | --- | --- |
| 19,168 | Vidal | Jan. 19, 1858 |
| 157,775 | Ale et al. | Dec. 15, 1874 |
| 161,585 | Young | Mar. 30, 1875 |
| 195,302 | Palen | Sept. 18, 1877 |
| 237,912 | Schaefle | Feb. 15, 1881 |
| 420,319 | Tardent | Jan. 28, 1890 |
| 2,424,077 | Carey | July 15, 1947 |